(12) United States Patent
Koskinen

(10) Patent No.: US 7,565,075 B2
(45) Date of Patent: Jul. 21, 2009

(54) SYSTEM AND METHOD FOR EXHIBITING IMAGE FOCUS INFORMATION ON A VIEWFINDER

(75) Inventor: Samu Koskinen, Tampere (FI)

(73) Assignee: Nokia Corporation, Espoo (FI)

( * ) Notice: Subject to any disclaimer, the term of this patent is extended or adjusted under 35 U.S.C. 154(b) by 427 days.

(21) Appl. No.: 11/178,853

(22) Filed: Jul. 11, 2005

(65) Prior Publication Data

US 2007/0009251 A1  Jan. 11, 2007

(51) Int. Cl.
*G03B 13/02* (2006.01)
*H04N 5/222* (2006.01)

(52) U.S. Cl. .................................. 396/148; 348/333.02

(58) Field of Classification Search ................. 396/121, 396/123, 147, 148, 150; 348/346, 333.02, 348/333.01
See application file for complete search history.

(56) References Cited

U.S. PATENT DOCUMENTS

| 6,157,782 | A  |    | 12/2000 | Aoyama |
| 6,710,950 | B2 |    | 3/2004  | Rouvinen et al. |
| 6,801,717 | B1 | *  | 10/2004 | Hofer .......................... 396/121 |
| 7,024,053 | B2 | *  | 4/2006  | Enomoto .................... 382/284 |
| 2003/0174233 | A1 |   | 9/2003 | Onozawa |

FOREIGN PATENT DOCUMENTS

WO   WO2004/070469   8/2004

OTHER PUBLICATIONS

Sharp, www.shart.co.ip, Jul. 18, 2005, pp. 1-5.
International Search Report for PCT Application No. PCT/IB2006/001900, Mailed Nov. 13, 2006.

* cited by examiner

*Primary Examiner*—Rodney E Fuller
(74) *Attorney, Agent, or Firm*—Foley & Lardner LLP

(57) ABSTRACT

An improved system and method for providing information concerning the level of focus of objects appearing on a viewfinder for a digital camera system. The present invention analyzes a plurality of objects or regions of an image that is being shown to a user through a viewfinder of an electronic device. The system creates an overview map that matches the objects within the image, and colors are applied to objects within the overview map, representing the focus quality levels of the respective objects. The overview map is superimposed over the image, providing the user with information concerning the relative focus quality of the respective objects.

20 Claims, 4 Drawing Sheets

SYSTEM AND METHOD FOR EXHIBITING IMAGE FOCUS INFORMATION ON A VIEWFINDER

FIELD OF THE INVENTION

The present invention relates generally to digital camera systems. More particularly, the present invention relates to digital camera systems with autofocus capabilities.

BACKGROUND OF THE INVENTION

In recent years, digital cameras have increased in popularity, both as stand-alone products and as part of other devices such as cellular telephones, personal digital assistants and other devices.

In both stand-alone digital cameras and cameras that are incorporated into devices such as mobile telephones, a viewfinder is often used to view an image before the image is actually captured by the camera module. Individuals may use the viewfinder to ensure that they have correctly framed the image, that the picture will not be tilted, and that the image is in proper focus. The viewfinder can take the form of a small LCD screen, which can also be used to perform other functions when the camera is not being used.

Although a viewfinder usually provides a user with a larger area to view the subject of the photograph than traditional camera viewing windows, they are still usually relatively small in size. For example, on a mobile telephone with digital camera capabilities, the viewfinder is no wider than the width of the mobile telephone. This small size makes it relatively difficult to see fine details on the viewfinder, and it also makes it difficult to determine whether objects or regions of the image are in proper focus. In addition, the relatively high processing capabilities that are required for a mobile device to display an image in substantially real time can also affect the appearance of such an image on the viewfinder. For these reasons, it can be quite difficult for a user to determine whether the level of focus in an image is of an acceptable quality.

Conventional systems have attempted to address this issue with various systems, but each has a number of drawbacks. For example, one conventional system automatically changes the color of the viewfinder's focus frame when the focus has been locked at an acceptable level. However, until the focus is locked, the user is not provided any information as to whether the image or individual portions are close to being in-focus and, if so, how close to being in focus. Other systems superimpose rectangles on those portions of the image that are most likely in focus. However, such systems do not provide sufficient information to the user about the relative level of focus for individual portions of the image.

It would therefore be desirable to have a system where a user is provided information concerning the level of focus of various objects or regions within an image as it is being shown on a viewfinder.

SUMMARY OF THE INVENTION

The present invention provides an improved system and method for informing a user of the focus quality of objects within a digital image. The present invention involves the monitoring of the focus quality of various image portions, and using different colors to indicate the focus quality of the respective portions.

The present invention provides for a number of benefits over conventional systems. In contrast to many conventional systems, the use of colors on a device's viewfinder provides a user with a very easy-to-read indicator of the focus quality level of various portions of a digital image. This is particularly beneficial in digital camera systems that have very small viewfinders, such as systems incorporated into mobile telephones and other mobile electronic devices. The present invention also provides the user with more information about focus quality than conventional systems that only use shapes such as rectangles to inform the user about the focus quality. By using a more comprehensive color scheme, the present invention not only informs the user about whether an image is in focus, but also the level of focus quality for each portion of the image.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
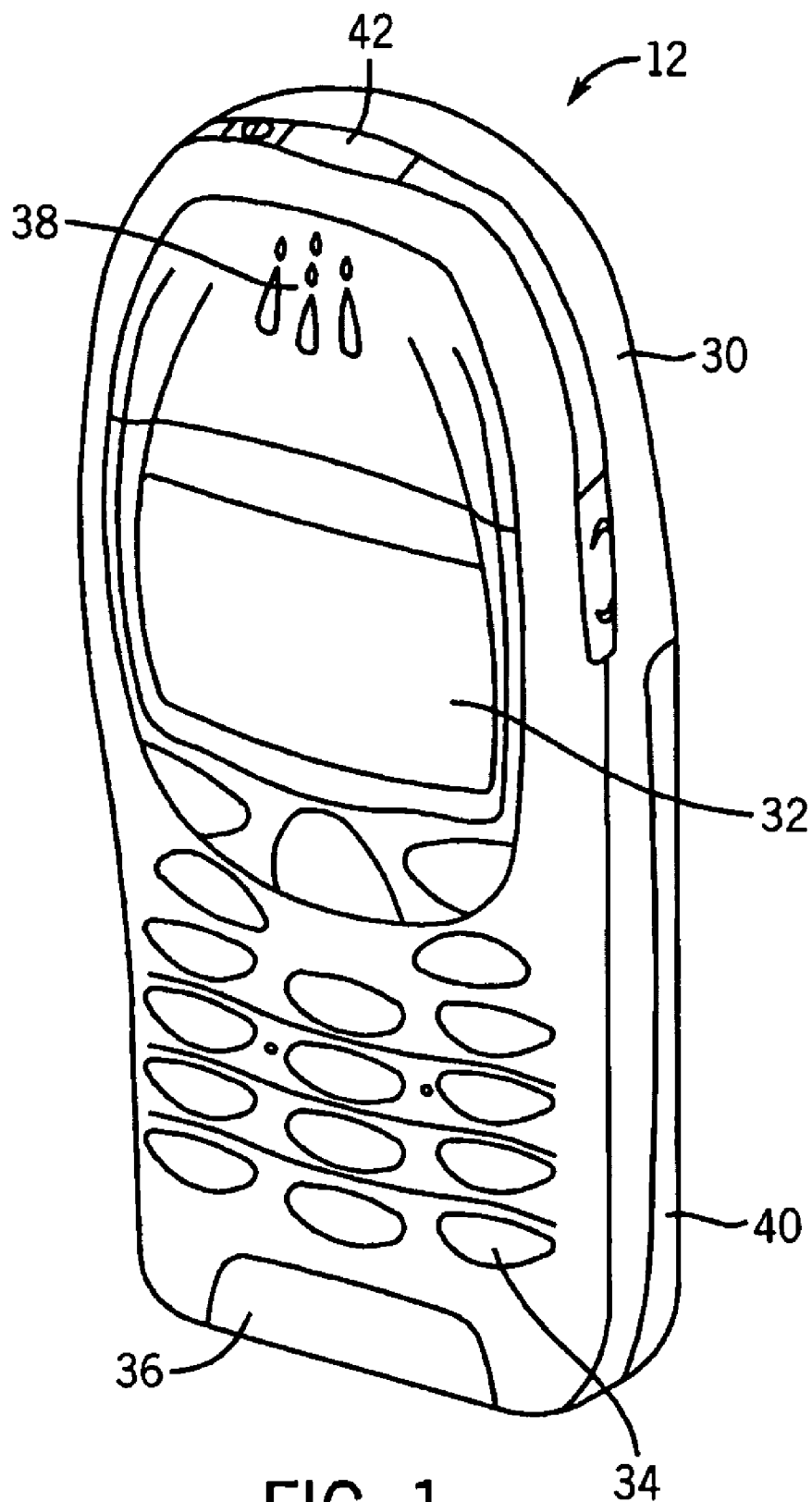
FIG. 1 is a perspective view of a mobile telephone with a built-in camera module that can be used in the implementation of the present invention.
Figure 2:
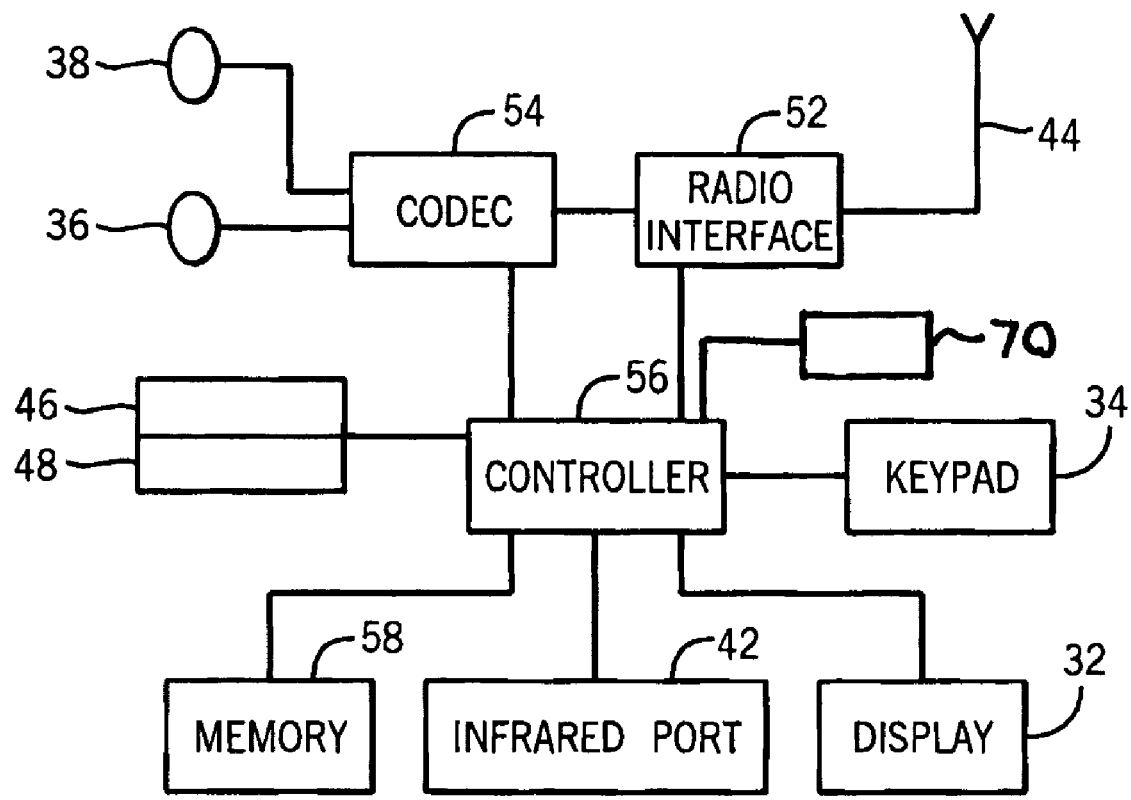
FIG. 2 is a schematic representation of the telephone circuitry of the mobile telephone of FIG. 2.

FIGS. 1 and 2 show one representative mobile telephone 12 within which the present invention may be implemented. It should be understood, however, that the present invention is not intended to be limited to one particular type of mobile telephone 12 or other electronic device. For example, exemplary devices may include, but are not limited to, a mobile telephone 12, a combination PDA and mobile telephone, a PDA, an integrated messaging device (IMD), a desktop computer, and a notebook computer. The devices may be stationary or mobile as when carried by an individual who is moving. The devices may also be located in a mode of transportation including, but not limited to, an automobile, a truck, a taxi, a bus, a boat, an airplane, a bicycle, a motorcycle, etc.

Figure 3:
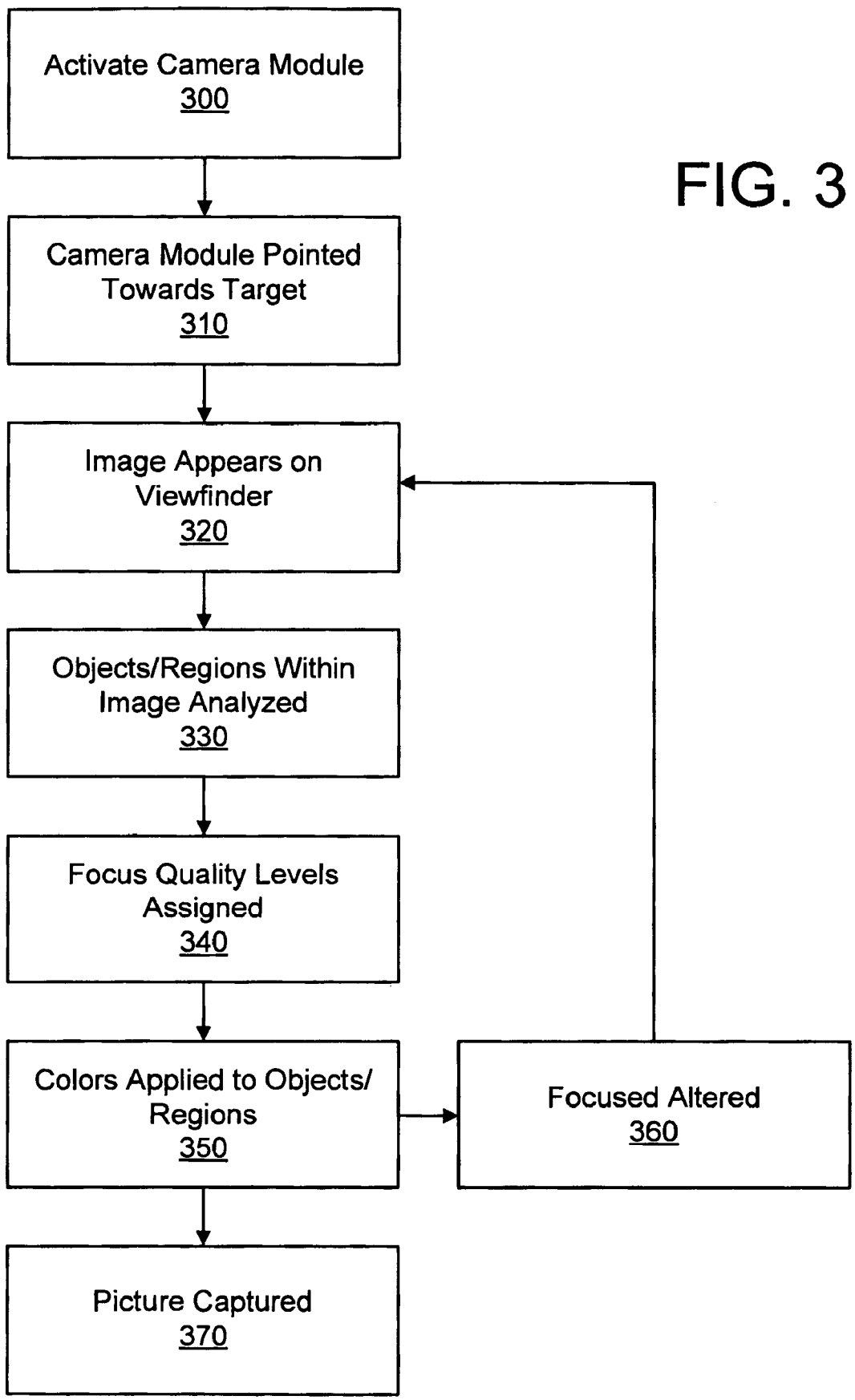
FIG. 3 is a flow chart showing the implementation of one embodiment of the present invention.

The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Such a device may also contain a speaker 60 for the pronunciation of words and a microphone 62 for receiving spoken word information from a user. Individual circuits and elements are all of a type well known in the art, for example in the Nokia range of mobile telephones. The mobile telephone 12 also includes a camera module 70 according to the present invention. The camera module 70 can take a variety of forms, and one such module is discussed in U.S. Pat. No. 6,710,950, assigned to Nokia Mobile Phones, Ltd. and incorporated herein by reference. The camera module 70 may have both autofocus and zooming capabilities, and it may also permit a user to manually focus an image instead of using an autofocus mechanism.

The present invention provides an improved system and method for providing information to a user concerning the focus quality of objects in an image in a situation where the user wishes to take a digital photograph. According to the present invention, an electronic device including a camera module 70 is capable of analyzing objects or regions within an image and color or shade the objects or regions based upon their focus quality. The shading and coloring can be continuously adjusted as different portions of the image are refocused either by the user or by a device's autofocus mechanism.

Figure 4:
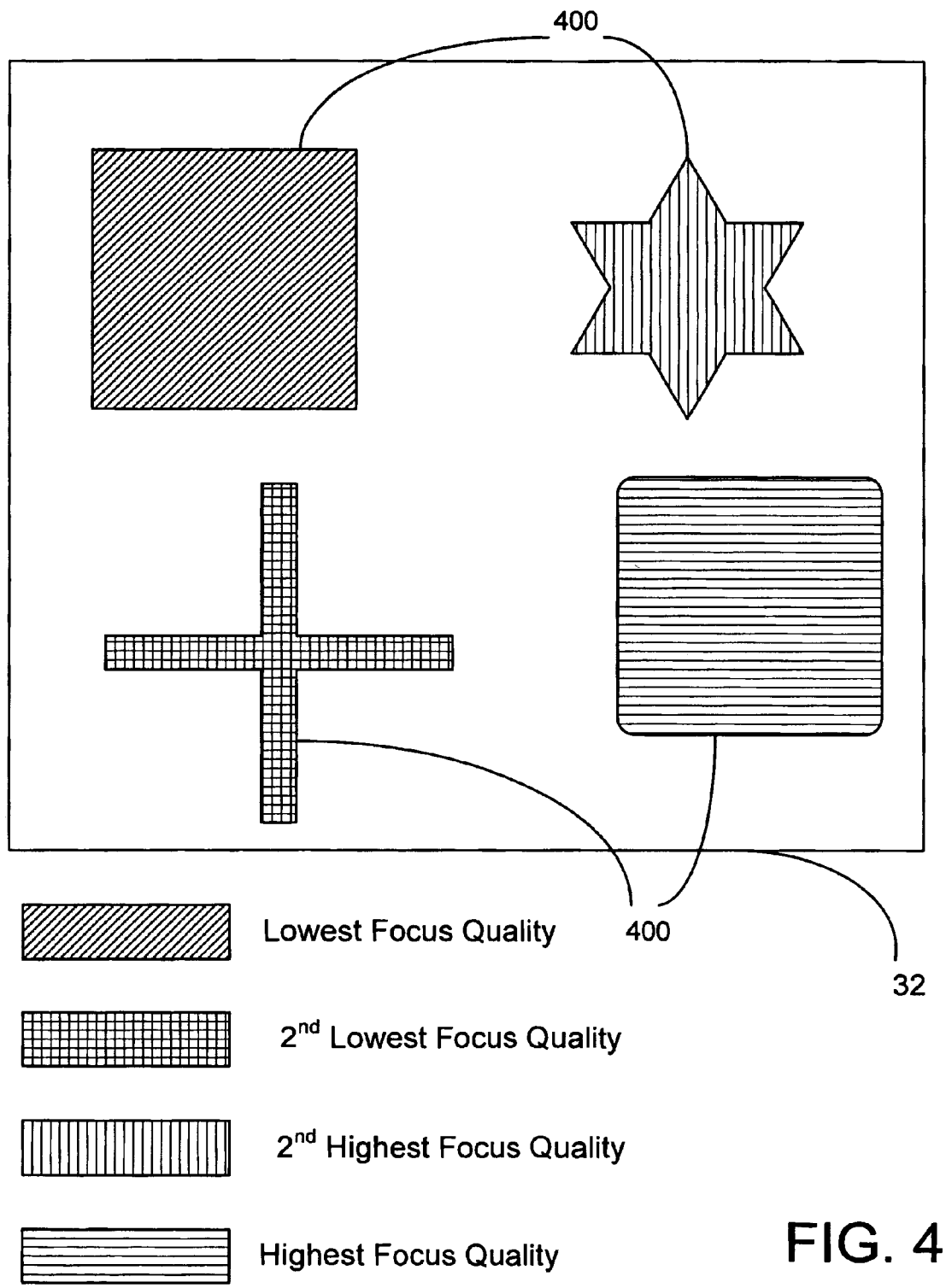
FIG. 4 is a depiction of a viewfinder on a mobile electronic device showing an image for capture by a camera, where various colors are superimposed on the image in accordance with one embodiment of the present invention.

FIG. 3 is a flow chart showing the implementation of one embodiment of the present invention. At step 300 in FIG. 3, the camera module 70 is activated. At some later time, when a user desires to take a picture of an object or scene, the user points the camera module 70 in the appropriate direction. This is represented at step 310. At step 320, an image of the scene that is desired to be captured is exhibited on the viewfinder of the associated electronic device. At step 330, the electronic device analyzes objects or regions within the exhibited image and creates an overview map. It should be noted that, although this step is depicted in FIG. 4 as occurring after step 320, in most situations these steps will occur substantially simultaneously. The overview map is ultimately superimposed over the image on the viewfinder. The analysis of the objects or regions involves determining whether each object or region is in proper focus, or the level of focus for each object or region.

At step 340, a focus quality level is assigned to objects based upon the determined quality level. In one embodiment, only "in focus" items are given a quality level. At step 350, a color is assigned to each object or region based upon the determined quality level. Colors can be assigned based upon predefined criteria. For example, if a particular system possesses four different quality levels, then the poorest quality level can be red, the second lowest level can be orange, the third level can be yellow, and the best quality level or completely "in focus" quality level can be green. These colors are added to the overview map to identify their respective objects or regions. At step 350, the overview map with the assigned colors are applied to the respective objects or regions appearing on the viewfinder. This provides the user with information as to the level of focus of the respective objects appearing on the viewfinder.

At step 360, the focus of the image is altered. This can be accomplished through a device's autofocus feature, via manual focus adjustment by the user, or via another method. The device then reanalyzes the image and changes the applied colors as necessary. When the user is satisfied with the focus quality as depicted by the applied colors, the user proceeds to capture the image on the device at step 370.

Focusing information for the implementation of the present invention can be measured in a manner that is similar to how autofocus measurements are currently performed. One difference over conventional systems, however, is that with the present invention, a full resolution image or a near-full resolution image is needed in order to obtain enough data to create the transparent color map which is superimposed over the image.

FIG. 4 shows a viewfinder where various objects within the image are shaded based upon their focus quality level according to the principles of the present invention. In this particular embodiment of the invention, the viewfinder comprises the display 32 of the mobile telephone 12 of FIGS. 1 and 2. In FIG. 4, the display 32 shows an image of four different objects 400, each having different focus quality levels at a given moment.

The coloring of objects or regions within the image can take a variety of forms. In one embodiment of the invention, the colors can be somewhat translucent so that the object in question can still be seen on the viewfinder. Alternatively, the coloring can be more solid in nature such that the underlying object or region is less visible. Other types of shading may also be used.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for providing a user with focus information for an image, comprising:

identifying an image for potential capture by a camera module;

identifying a plurality of objects within the image;

analyzing the plurality of objects to determine the level of focus for each of the plurality objects;

assigning colors to the plurality of objects based upon the level of focus for each object, wherein the colors are assigned to the plurality of objects based upon predefined criteria;

exhibiting the image with the assigned colors being exhibited in conjunction with their respective objects; and creating a transparent overview map that is substantially identical to the image.

2. The method of claim 1, wherein the predefined criteria comprises a plurality of predetermined focus quality ranges, and wherein each predetermined focus quality range is assigned a particular color.

3. The method of claim 1, wherein the assigned colors are exhibited in a translucent form such that both the colors and their associated objects are viewable at the same time.

4. The method of claim 1, further comprising:
applying the colors to the image in the locations of the overview map that correspond to the respective objects, wherein, when the image and the colors are exhibited, the overview map including the colors is superimposed on the image during exhibition.

5. The method of claim 1, wherein the camera module is incorporated into a mobile telephone.

6. The method of claim 1, wherein the exhibition occurs on a viewfinder operatively connected to the camera module.

7. The method of claim 1, further comprising,
upon the level of focus of at least one of the plurality of objects being altered, reassigning the colors to the plurality of objects based upon predefined criteria to reflect the alteration of the respective focus levels; and
exhibiting the image with the assigned colors being exhibited in conjunction with their respective objects to reflect the alteration of the respective focus levels.

8. A computer program product, embodied on a computer-readable medium, for providing a user with focus information for an image, comprising:
computer code for identifying an image for potential capture by a camera module;
computer code for identifying a plurality of objects within the image;
computer code for analyzing the plurality of objects to determine the level of focus for each of the plurality objects;
computer code for assigning colors to the plurality of objects based upon the level of focus for each object, wherein the colors are assigned to the plurality of objects based upon predefined criteria;
computer code for exhibiting the image with the assigned colors being exhibited in conjunction with their respective objects; and
computer code for creating a transparent overview map that is substantially identical to the image.

9. The computer program product of claim 8, wherein the predefined criteria comprises a plurality of predetermined focus quality ranges, and wherein each predetermined focus quality range is assigned a particular color.

10. The computer program product of claim 8, wherein the assigned colors are exhibited in a translucent form such that both the colors and their associated objects are viewable at the same time.

11. The computer program product of claim 8, further comprising:
computer code for applying the colors to the image in the locations of the overview map that correspond to the respective objects,
wherein, when the image and the colors are exhibited, the overview map including the colors is superimposed on the image during exhibition.

12. The computer program product of claim 8, wherein the camera module is incorporated into a mobile telephone.

13. The computer program product of claim 8, wherein the exhibition occurs on a viewfinder operatively connected to the camera module.

14. The computer program product of claim 8, further comprising,
computer code for, upon the level of focus of at least one of the plurality of objects being altered, reassigning the colors to the plurality of objects based upon predefined criteria to reflect the alteration of the respective focus levels; and
computer code for exhibiting the image with the assigned colors being exhibited in conjunction with their respective objects to reflect the alteration of the respective focus levels.

15. An electronic device, comprising:
a camera module;
a processor operatively connected to the camera module; and
a memory unit operatively connected to the processor and including:
computer code for identifying an image for potential capture by the camera module;
computer code for identifying a plurality of objects within the image;
computer code for analyzing the plurality of objects to determine the level of focus for each of the plurality objects;
computer code for assigning color to the plurality of objects based upon the level of focus for each object, wherein the colors are assigned to the plurality of objects based upon predefined criteria;
computer code for exhibiting the image with the assigned colors being exhibited in conjunction with their respective objects; and
computer code for creating a transparent overview map that is substantially identical to the image.

16. The electronic device of claim 15, wherein the predefined criteria comprises a plurality of predetermined focus quality ranges, and wherein each predetermined focus quality range is assigned a particular color.

17. The electronic device of claim 15, wherein the assigned colors are exhibited in a translucent form such that both the colors and their associated objects are viewable at the same time.

18. The electronic device of claim 15, wherein the memory unit further comprises computer code for:
applying the colors to the image in the locations of the overview map that correspond to the respective objects,
wherein, when the image and the colors are exhibited, the overview map including the colors is superimposed on the image during exhibition.

19. The electronic device of claim 15, wherein the camera module is incorporated into a mobile telephone.

20. The electronic device of claim 15, wherein the memory unit further comprises:
computer code for, upon the level of focus of at least one of the plurality of objects being altered, reassigning the colors to the plurality of objects based upon predefined criteria to reflect the alteration of the respective focus levels; and
computer code for exhibiting the image with the assigned colors being exhibited in conjunction with their respective objects to reflect the alteration of the respective focus levels.

* * * * *